US012726034B2

(12) United States Patent
Ono et al.

(10) Patent No.: US 12,726,034 B2
(45) Date of Patent: Sep. 1, 2026

(54) STORAGE BATTERY CONTROL DEVICE, POWER STORAGE SYSTEM, AND STORAGE BATTERY CONTROL METHOD

(71) Applicant: YAZAKI CORPORATION, Tokyo (JP)

(72) Inventors: Chihiro Ono, Susono (JP); Takahiro Syouda, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 704 days.

(21) Appl. No.: 18/317,061

(22) Filed: May 13, 2023

(65) Prior Publication Data

US 2023/0396080 A1 Dec. 7, 2023

(30) Foreign Application Priority Data

Jun. 6, 2022 (JP) ................................ 2022-091338

(51) Int. Cl.

*H02J 7/54* (2026.01)
*B60L 58/22* (2019.01)
*H02J 7/50* (2026.01)
*H02J 7/52* (2026.01)
*H02J 7/82* (2026.01)

(52) U.S. Cl.

CPC ................ *H02J 7/54* (2026.01); *B60L 58/22* (2019.02); *H02J 7/50* (2026.01); *H02J 7/52* (2026.01); *H02J 7/82* (2026.01)

(58) Field of Classification Search

CPC ........................................................ H02J 7/54
USPC ........................................................ 320/118
See application file for complete search history.

(56) References Cited

U.S. PATENT DOCUMENTS

2013/0106356 A1* 5/2013 Nakao ..................... B60L 58/21 320/118
2020/0393518 A1* 12/2020 Takegami ............ G01R 31/367
2021/0399558 A1 12/2021 Ono et al.
2022/0060029 A1 2/2022 Syouda et al.
2023/0223766 A1* 7/2023 Gourari ..................... H02J 7/56
2023/0387700 A1* 11/2023 Singer ....................... H02J 7/54

FOREIGN PATENT DOCUMENTS

JP 2022-1006 A 1/2022
JP 2022-35969 A 3/2022

* cited by examiner

*Primary Examiner* — Ahmed H Omar
(74) *Attorney, Agent, or Firm* — KENEALY VAIDYA LLP

(57) ABSTRACT

A storage battery control device for controlling a power storage system including storage battery modules and a bypass circuit executes a first process of causing the storage battery modules to discharge while switching the storage battery modules caused to be bypassed by the bypass circuit so as to reduce a difference between remaining discharge amounts until discharge completion of the storage battery modules; and a second process of completing the discharge of the storage battery modules after the first process. The first process is executed until an OCV or an SOC of the storage battery modules decreases to be equal to or smaller than a threshold value of the OCV or the SOC set for the storage battery modules. The first process is executed so that available output power of the storage battery module caused to discharge does not fall below minimum necessary power of a power supply destination.

7 Claims, 3 Drawing Sheets

STORAGE BATTERY CONTROL DEVICE, POWER STORAGE SYSTEM, AND STORAGE BATTERY CONTROL METHOD

CROSS-REFERENCE TO RELATED APPLICATIONS

This application is based on and claims priority under 35 USC 119 from Japanese Patent Application No. 2022-091338 filed on Jun. 6, 2022, the contents of which are incorporated herein by reference.

TECHNICAL FIELD

The present invention relates to a storage battery control device, a power storage system, and a storage battery control method.

BACKGROUND ART

As a battery control unit that controls the discharge of a power storage system in which a plurality of storage batteries are connected in series, a battery control unit has been known, which selects a storage battery that has reached a discharge end state and bypasses the storage battery to allow another power storage battery to discharge (see, for example, Patent Literature 1). In the battery control unit described in Patent Literature 1, storage batteries are switched to a bypass state in order from a storage battery whose dischargeable capacity has reached a predetermined value, and after the dischargeable capacities of all the storage batteries have reached a predetermined value, all the storage batteries are switched to a discharge state. Thereafter, the storage batteries are switched to the bypass state in order from a storage battery whose dischargeable capacity has reached a discharge end state.

CITATION LIST

Patent Literature

Patent Literature 1: JP2022-1006A

SUMMARY OF INVENTION

In the system described in Patent Literature 1, a process of equalizing the dischargeable capacities of all the storage batteries to a predetermined value is executed, and even when the process is executed, it is necessary to continuously supply power for driving a system as a power supply destination, and thus measures are required.

In view of the above circumstances, an object of the present invention is to provide a storage battery control device, a power storage system, and a storage battery control method that can continuously supply power for driving a system as a power supply destination in a power storage system in which a plurality of storage batteries are connected in series.

A storage battery control device of the present disclosure is configured to control a power storage system including a plurality of storage batteries connected in series and a bypass circuit configured to bypass each of the storage batteries. The storage battery control device is configured to execute a first process of causing each of the plurality of storage batteries to discharge while switching the storage batteries caused to be bypassed by the bypass circuit so as to reduce a difference between remaining discharge amounts until discharge completion of the plurality of storage batteries; and a second process of completing the discharge of the plurality of storage batteries after the first process. The first process is executed until an open circuit voltage (OCV) or a state of charge (SOC) of each of the storage batteries decreases to be equal to or smaller than a threshold value of the OCV or the SOC set for each of the storage batteries, and the first process is executed so that available output power of the storage battery caused to discharge does not fall below minimum necessary power of a power supply destination.

A power storage system of the present disclosure includes a plurality of storage batteries connected in series, a bypass circuit configured to bypass each of the storage batteries; and a storage battery control device configured to control the bypass circuit. The storage battery control device is configured to execute a first process of causing each of the plurality of storage batteries to discharge while switching the storage batteries bypassed by the bypass circuit so as to reduce a difference between remaining discharge a mounts until discharge completion of the plurality of storage batteries, and a second process of completing the discharge of the plurality of storage batteries after the first process. The first process is executed until an open circuit voltage (OCV) or a state of charge (SOC) of each of the storage batteries decreases to be equal to or smaller than a threshold value of the OCV or the SOC set for each of the storage batteries, and the first process is executed so that available output power of the storage battery caused to discharge does not fall below minimum necessary power of a power supply destination.

A storage battery control method of the present disclosure is executed using a storage battery control device configured to control a power storage system including a plurality of storage batteries connected in series and a bypass circuit configured to bypass each of the storage batteries. The storage battery control method includes executing, by the storage battery control device, a first procedure of causing each of the plurality of storage batteries to discharge while switching the storage batteries caused to be bypassed by the bypass circuit so as to reduce a difference between remaining discharge amounts until discharge completion of the plurality of storage batteries, and a second procedure of completing the discharge of the plurality of storage batteries after the first procedure. The first procedure is executed by the storage battery control device until an open circuit voltage (OCV) or a state of charge (OCV) of each of the storage batteries decreases to be equal to or smaller than a threshold value of the open circuit voltage or the SOC set for each of the storage batteries, and the first procedure is executed by the storage battery control device so that available output power of the storage battery caused to discharge does not fall below minimum necessary power of a power supply destination.

According to the present invention, a power storage system in which a plurality of storage batteries are connected in series can continuously supply power for driving a system as a power supply destination.

DESCRIPTION OF EMBODIMENTS

The present invention will be described below in accordance with a preferred embodiment. Also, it should be noted that the present invention is not limited to the embodiment to be illustrated below, and the embodiment can be appropriately modified without departing from the gist of the present invention. In addition, in the embodiment illustrated below, illustration and description of some configurations are omitted, but regarding details of the omitted techniques, publicly known or well-known techniques are appropriately applied as long as there is no contradiction with the contents described below.

Figure 1:
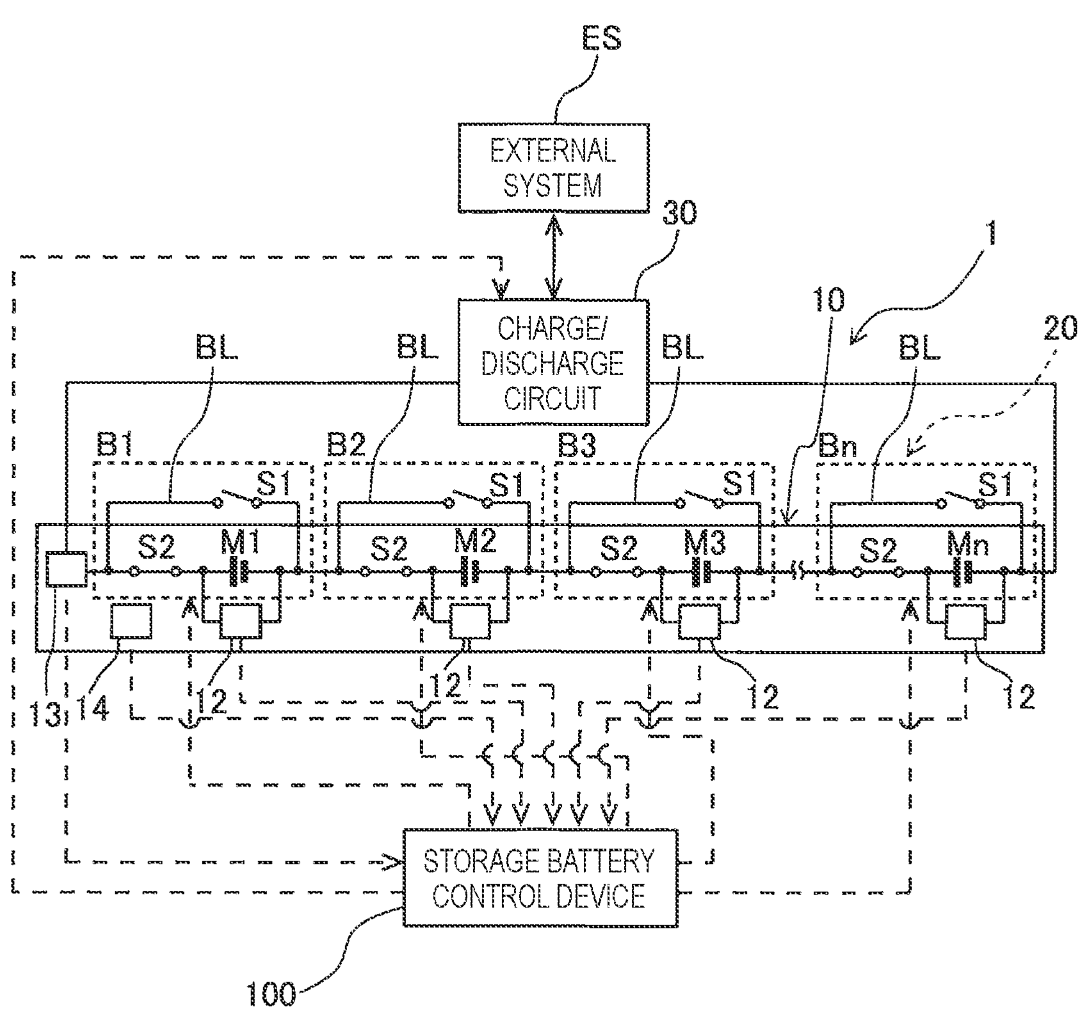
FIG. 1 is a diagram schematically showing a power storage system including a storage battery control device according to an embodiment of the present invention.

FIG. 1 is a diagram schematically showing a power storage system 1 including a storage battery control device 100 according to an embodiment of the present invention. As shown in this drawing, the power storage system 1 includes a storage battery string 10, a bypass circuit 20, a charge/discharge circuit 30, and the storage battery control device 100.

The electrical storage battery string 10 is a stationary or in-vehicle power supply including n (n represents an integer of 2 or more) storage battery modules M1 to Mn connected in series. Although not particularly limited, the storage battery string 10 according to the present embodiment is obtained by recycling used storage batteries, and the storage battery modules M1 to Mn differ in a degree of deterioration. The storage battery modules M1 to Mn are secondary batteries such as a lithium ion battery and a lithium ion capacitor, are charged by being supplied with power from an external system ES through the charge/discharge circuit 30, and discharge the charged power through the charge/discharge circuit 30 to supply power to the external system ES.

The external system ES includes a load, a generator, and the like. When the power storage system 1 is stationary, a household electrical appliance, a commercial power supply system, a liquid crystal display, a communication module, and the like serve as the load, and a solar photovoltaic power generation system or the like serves as the generator. On the other hand, when the power storage system 1 is used in a vehicle, a drive motor, an air conditioner, various in-vehicle electrical components, and the like serve as the load. The drive motor serves as the load and also as the generator.

The storage battery string 10 may include n storage battery cells or storage battery packs connected in series, instead of the n storage battery modules M1 to Mn connected in series. The power storage system 1 may include a bypass circuit that bypasses the storage battery cells or the storage battery packs.

The storage battery string 10 includes a plurality of voltage measurement units 12, a current measurement unit 13, and a battery temperature measurement unit 14. The voltage measurement unit 12 is connected between positive and negative electrode terminals of each of the storage battery modules M1 to Mn. The voltage measurement unit 12 measures an inter-terminal voltage of each of the storage battery modules M1 to Mn.

The current measurement unit 13 is provided in a current path of the storage battery string 10. The current measurement unit 13 measures the charge/discharge current of the storage battery string 10. The storage battery string 10 is provided with the battery temperature measurement unit 14. The battery temperature measurement unit 14 measures the temperature of batteries in the storage battery string 10.

The bypass circuit 20 includes n (n represents an integer of 2 or more) bypass circuits B1 to Bn respectively provided for the storage battery modules M1 to Mn. Each of the bypass circuits B1 to Bn includes a bypass line BL and switches S1 and S2. The bypass line BL is a power line that bypasses each of the storage battery modules M1 to Mn. The switch 5 S1 is provided in the bypass line BL. The switch S1 is, for example, a mechanical switch. The switch S2 is provided between a positive electrode of each of the storage battery modules M1 to Mn and one end of the bypass line BL. The switch S2 is, for example, a semiconductor switch or a relay.

The storage battery module M1 at the beginning and the storage battery module Mn at the end are connected to the external system ES via the charge/discharge circuit 30. When the switches S1 are opened and the switches S2 are closed in all the bypass circuits B1 to Bn, all the storage battery modules M1 to Mn are connected in series to the charge/discharge circuit 30 and the external system ES. On the other hand, when the switches S2 are opened and the switches S1 are closed in any one of the bypass circuits B1 to Bn, the storage battery modules M1 to Mn corresponding to the bypass circuits B1 to Bn are bypassed.

The storage battery control device 100 is connected to the storage battery string 10, the bypass circuit 20, and the charge/discharge circuit 30, and executes monitoring and control of the storage battery modules M1 to Mn, switching control of the bypass circuits B1 to Bn, and charge/discharge control using the charge/discharge circuit 30. In particular, when a discharge mode is executed, the storage battery control device 100 according to the present embodiment executes a first process of equalizing the remaining discharge amounts (hereinafter, referred to as remaining discharge capacities) until the completion of the discharge of all the storage battery modules M1 to Mn and a second process of causing all the storage battery modules M1 to Mn to discharge after the first process. In the first process, the storage battery control device 100 equalizes the remaining discharge capacities of all the storage battery modules M1 to Mn by causing the storage battery modules M1 to Mn to discharge while switching the bypass circuits B1 to Bn in accordance with a discharge bypass schedule generated in advance.

The discharge bypass schedule includes schedule information and voltage information. The schedule information is information in which a combination of the storage battery modules M1 to Mn caused to discharge and the storage battery modules M1 to Mn caused to be bypassed is set in time series. The schedule information is, for example, information indicating that storage battery modules M1 to M6 are caused to discharge and the other storage battery modules M7 to Mn are bypassed in a first period, and the storage battery modules M5 to Mn are caused to discharge, and the other storage battery modules M1 to M4 are bypassed in a second period. On the other hand, the voltage information is information of a threshold value of open circuit voltage (OCV) of each of the storage battery modules M1 to Mn which is a threshold value when the first process is ended. The threshold value of the OCV of each of the storage battery modules M1 to Mn as the voltage information is set for the purpose of equalizing the remaining discharge capacities of the plurality of storage battery modules M1 to Mn at the end time point of the first process.

Here, the discharge bypass schedule is set so that the available output power of the storage battery string 10 during the execution of the first process is continuously maintained to be equal to or greater than the minimum necessary power of a system as a power supply destination. That is, in the periods during the execution of the first process, the combination of the storage battery modules M1 to Mn caused to discharge and the storage battery modules M1 to Mn caused to be bypassed is set so that the available output power of the storage battery string 10 does not fall below the minimum necessary power of the system as the power supply destination.

The storage battery control device 100 updates the discharge bypass schedule when a predetermined condition is satisfied at the start of the discharge mode. Examples of the predetermined condition include the following (1) to (6). When such a condition is satisfied, it is assumed that variations in the remaining discharge capacities of the storage battery modules M1 to Mn are increased. Further, a relative relation of the remaining discharge capacities among the storage battery modules M1 to Mn also changes each time. Therefore, when the predetermined condition is satisfied at the start of the discharge mode, the storage battery control device 100 generates a discharge bypass schedule again.

The storage battery control device 100 stores an OCV-SOC curve line indicating a relation between an OCV and a state of charge (SOC) of the storage battery modules M1 to Mn, and the initial capacities and a state of health (SOH) of the storage battery modules M1 to Mn as information of the storage battery modules M1 to Mn. The discharge amount of the storage battery modules M1 to Mn varies depending on the degree of deterioration or the temperature. Therefore, the storage battery control device 100 calculates and sets the threshold value of the OCV based on the information or the temperature information of the storage battery modules M1 to Mn, the estimated value of the OCV, and the like.

The SOC can be estimated using various publicly known methods such as a current integration method, a method (voltage method) determined from OCV, and a method obtained by combining the current integration method and the voltage method. In addition, the SOC can be estimated using various publicly known methods for estimation using a temporal change in the SOC and/or a temporal increase in the internal resistance. Examples of the SOH estimation method include a method based on a charge/discharge test, a method based on a current integration method, a method based on measurement of an open circuit voltage, a method based on measurement of a terminal voltage, a method based on a model (all the above methods are a method using a temporal change in the SOC), a method based on AC impedance measurement, a method for determination using an adaptive digital filter based on a model, a method based on linear regression (gradient of a straight line of I-V characteristics) from I-V characteristics (current-voltage characteristics), and a method based on a step response (all the above methods are a method for estimation using a temporal increase in internal resistance).

The remaining discharge capacity can be calculated according to the following equation (1).

$$\text{Remaining discharge capacity}[Ah]=CC\times SOC/100 \quad (1)$$

Here, CC represents a current battery capacity of each of the storage battery modules M1 to Mn, and can be calculated according to the following equation (2).

$$CC[Ah]=C_0\times SOH/100 \quad (2)$$

Here, $C_0$ represents an initial capacity (Ah) of each of the storage battery modules M1 to Mn.

Figure 2:
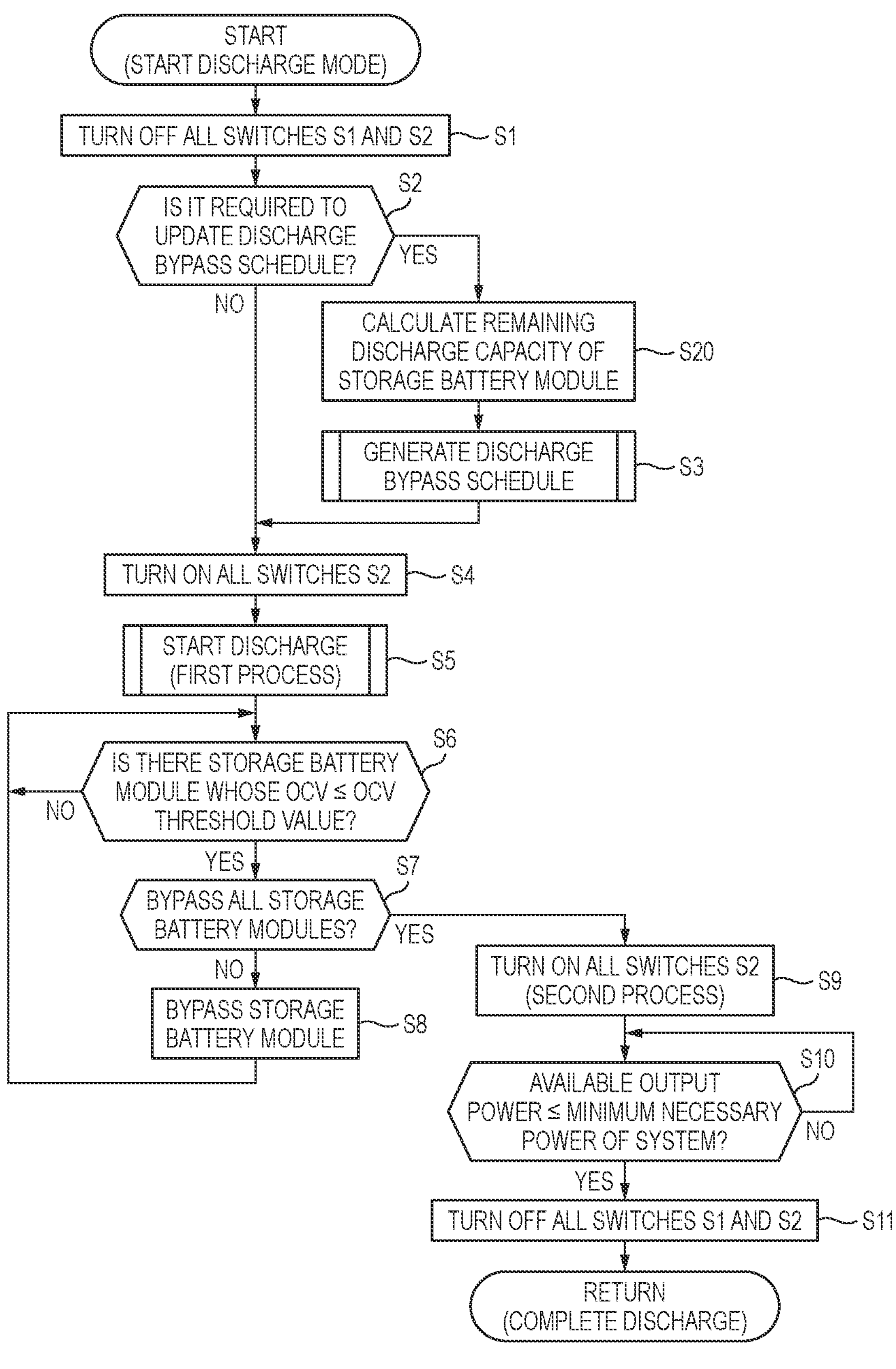
FIG. 2 is a flowchart showing a process of executing a discharge mode by the storage battery control device shown in FIG. 1.

FIG. 2 is a flowchart showing a process of executing a discharge mode by the storage battery control device 100 shown in FIG. 1. As shown in this flowchart, the process is started when the power storage system 1 shown in FIG. 1 enters the discharge mode.

First, in step S1, the storage battery control device 100 turns off all the switches S1 and S2 of the storage battery string 10 shown in FIG. 1. Next, in step S2, the storage battery control device 100 determines whether a predetermined condition required by the update of the discharge bypass schedule is satisfied. The satisfaction of the predetermined condition means that at least one of the following conditions (1) to (6) is satisfied:

(1) switching to the discharge mode;

(2) the charge time before the discharge mode being equal to or longer than a predetermined time;

(3) the charge power capacity before the discharge mode being equal to or larger than a predetermined capacity;

(4) the temperature change from the time of creating the previous discharge bypass schedule being equal to or higher than a predetermined temperature;

(5) the number of interrupts of charge during discharge reaching a predetermined number of times in an accumulated manner; and (6) the operating state of the power storage system being changed, such as a change in average discharge power or a change in remaining discharge capacity at the end of the second process.

When an affirmative determination is made in step S2, the process proceeds to step S20. In step S20, the storage battery control device 100 calculates the remaining discharge capacities of the storage battery modules M1 to Mn based on the initial capacity, the OCV, the SOC, and the SOH. Next, in step S3, the storage battery control device 100 generates a discharge bypass schedule in accordance with the remaining discharge capacities of the storage battery module M1 to Mn calculated in step S20. At this time, the storage battery control device 100 sets a combination of the storage battery modules M1 to Mn caused to discharge and the storage battery modules M1 to Mn caused to be bypassed so that the available output power of the storage battery string 10 is continuously maintained to be equal to or greater than the minimum necessary power of the system as the power supply destination. Further, the storage battery control device 100 sets a threshold value of the OCV of each of the storage battery modules M1 to Mn which is a threshold value at the end of the first process based on the battery information stored for each of the storage battery modules M1 to Mn such as the OCV-SOC curve line of the storage battery modules M1 to Mn. The process proceeds from step S3 to step S4.

On the other hand, when a negative determination is made in step S2, the process proceeds to step S4 without updating the discharge bypass schedule. In this case, the processes in steps S5 to S8 are executed according to the discharge bypass schedule used in the previous discharge mode.

In step S4, the storage battery control device 100 turns on all the switches S2 of the storage battery string 10 to connect all the storage battery modules M1 to Mn in series. Next, in step S5, the storage battery control device 100 starts the first process. In the first process, the storage battery control device 100 causes the storage battery modules M1 to Mn to discharge while switching the bypass circuits B1 to Bn in accordance with the discharge bypass schedule.

Next, in step S6, the storage battery control device 100 compares the threshold values of the OCV set in step S3 or during the execution of the discharge mode before the previous time with the OCV of the storage battery modules M1 to Mn, and determines whether there is a storage battery module, among the storage battery modules M1 to Mn, whose OCV has decreased to be equal to or smaller than the threshold value. Step S6 is repeated until an affirmative determination is made, and when an affirmative determination is made in step S6, the process proceeds to step S7.

In step S7, the storage battery control device 100 determines whether all the storage battery modules M1 to Mn of the storage battery string 10 are respectively bypassed by the bypass circuits B1 to Bn. When an affirmative determination is made in step S7, the process proceeds to step S9. When a negative determination is made in step S7, the process proceeds to step S8.

In step S8, the storage battery control device 100 causes the corresponding bypass circuits B1 to Bn to bypass the storage battery modules M1 to Mn determined to have the OCV decreased to be equal to or smaller than the threshold value in step S6. The process returns from step S8 to step S6.

On the other hand, in step S9, the storage battery control device 100 turns on all the switches S2 of the storage battery string 10 to connect all the storage battery modules M1 to Mn in series. That is, the storage battery control device 100 executes the second process of causing all the storage battery modules M1 to Mn to discharge after the first process.

Next, in step S10, the storage battery control device 100 determines whether the available output power of the storage battery string 10 has decreased to be equal to or lower than the minimum necessary power of the system as the power supply destination. Step S10 is repeated until an affirmative determination is made, and when an affirmative determination is made in step S10, the process proceeds to step S11.

In step S11, the storage battery control device 100 turns off all the switches S1 and S2 of the storage battery string 10. Then, the process of the discharge mode ends.

As described above, the storage battery control device 100 according to the present embodiment first executes the first process during the execution of the discharge mode, and then executes the second process after executing the first process. In the first process, the storage battery control device 100 causes the storage battery modules M1 to Mn to discharge while switching the storage battery modules M1 to Mn bypassed by the bypass circuits B1 to Bn so as to reduce a difference between the remaining discharge capacities of the plurality of storage battery modules M1 to Mn. Thereafter, the storage battery control device 100 completes the discharge of the plurality of storage battery modules M1 to Mn in the second process. Accordingly, it is possible to uniformly maintain the remaining discharge capacities of the plurality of storage battery modules M1 to Mn from the start of the second process to a 5 later stage of the second process. Accordingly, more storage battery modules M1 to Mn can be caused to discharge without being bypassed until the later stage of the discharge mode in which the voltage of the storage battery modules M1 to Mn decreases.

Here, the storage battery control device 100 executes the first process until the OCV of each of the storage battery modules M1 to Mn decreases to be equal to or smaller than the threshold value of the OCV set for each of the storage battery modules M1 to Mn. By setting the threshold value of the OCV of each of the storage battery modules M1 to Mn for each of the storage battery modules M1 to Mn in accordance with the deterioration state, the temperature, or the like of each of the storage battery modules M1 to Mn, it is possible to reduce the difference between the remaining discharge capacities of the plurality of storage battery modules M1 to Mn at the end time point of the first process.

Further, the storage battery control device 100 executes the first process so that the available output power of the storage battery modules M1 to Mn caused to discharge does not fall below the minimum necessary power of the power supply destination. Accordingly, the power for driving the system as the power supply destination can be continuously supplied from the start of the first process to the later stage of the discharge mode in which the voltage of each of the storage battery modules M1 to Mn decreases.

In addition, the storage battery control device 100 executes the first process according to the discharge bypass schedule in which a combination of the two or more storage battery modules M1 to Mn caused to discharge and the storage battery modules M1 to Mn caused to be bypassed is determined for each period. The discharge bypass schedule is set to reduce the difference between the remaining discharge capacities of the plurality of storage battery modules M1 to Mn in a state where the available output power of the plurality of storage battery modules M1 to Mn is maintained to be equal to or greater than the minimum necessary power of the system as the power supply destination. Here, it is conceivable to sequentially bypass the storage battery modules M1 to Mn of which the OCV has decreased to the threshold value, and in this case, the number of the storage battery modules M1 to Mn caused to discharge decreases and the available output power of the storage battery string 10 decreases as the process approaches the later stage of the first process. In contrast, in the present embodiment, more storage battery modules M1 to Mn can discharge without being bypassed until the later stage of the first process, and the available output power of the storage battery string 10 can be maintained to be equal to or greater than the minimum necessary power of the system as the power supply destination.

In addition, the storage battery control device 100 estimates the state of each of the storage battery modules M1 to Mn before the start of the first process, and determines whether it is necessary to update the threshold value of the OCV of each of the storage battery modules M1 to Mn based on the estimation result. Accordingly, the threshold value of the OCV of each of the storage battery modules M1 to Mn can be set for each of the storage battery modules M1 to Mn in accordance with the deterioration state, the temperature, or the like of each of the storage battery modules M1 to Mn. Accordingly, it is possible to reduce the difference between the remaining discharge capacities of the plurality of storage battery modules M1 to Mn at the end time point of the first process.

Figure 3:
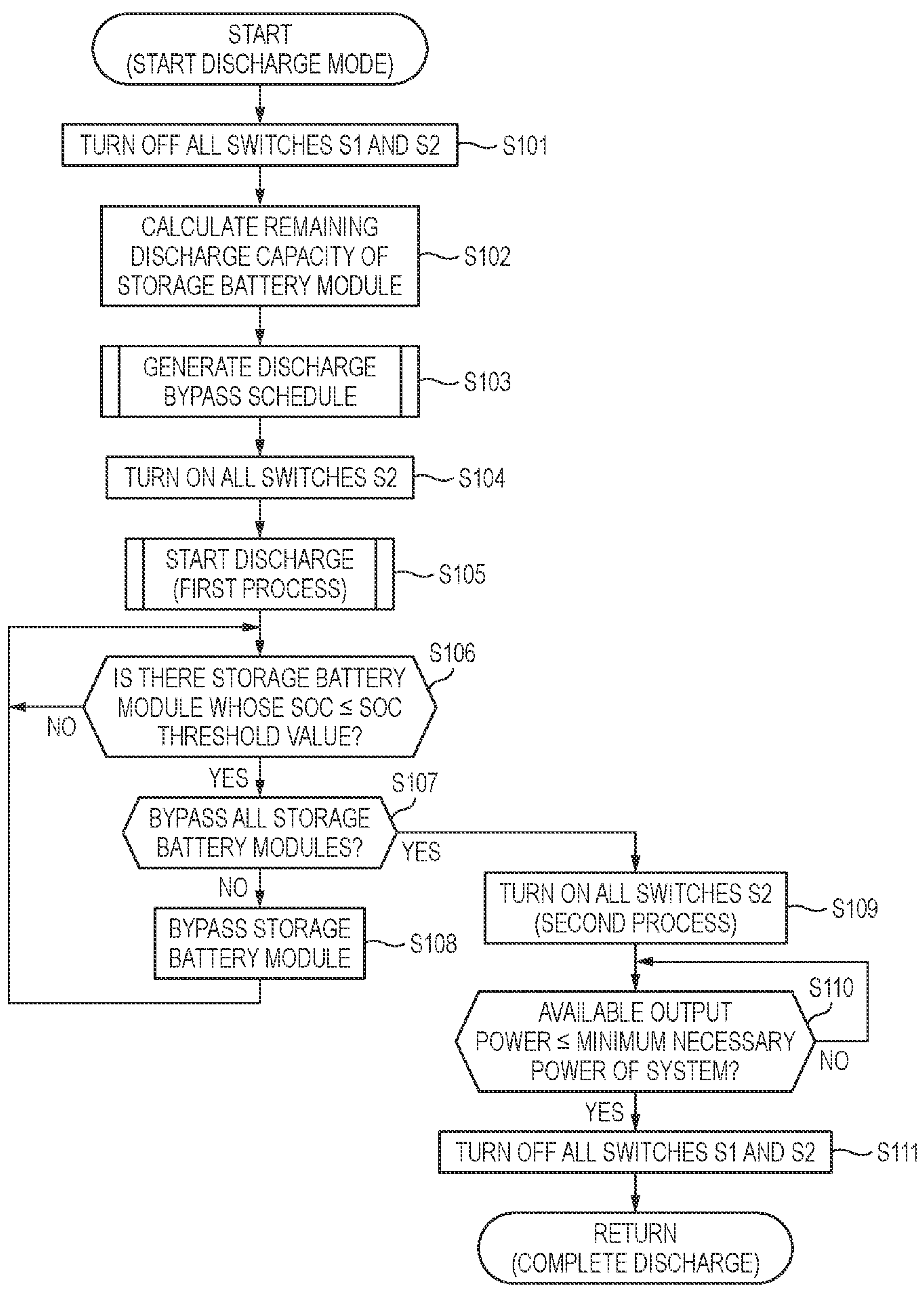
FIG. 3 is a flowchart showing another embodiment of the process of executing a discharge mode by the storage battery control device shown in FIG. 1.

FIG. 3 is a flowchart showing another embodiment of the process of executing a discharge mode by the storage battery control device 100 shown in FIG. 1. As shown in this flowchart, the process is started when the power storage system 1 shown in FIG. 1 enters the discharge mode.

First, in step S101, the storage battery control device 100 turns off all the switches S1 and S2 of the storage battery string 10. In step S102, the storage battery control device 100 calculates the remaining discharge capacities of the storage battery modules M1 to Mn based on the initial capacity, the OCV, the SOC, and the SOH.

Next, in step S103, the storage battery control device 100 generates a discharge bypass schedule in accordance with the remaining discharge capacities of the storage battery module M1 to Mn calculated in step S102. At this time, the storage battery control device 100 sets a combination of the storage battery modules M1 to Mn caused to discharge and the storage battery modules M1 to Mn caused to be bypassed so that the available output power of the storage battery string 10 is continuously equal to or greater than the minimum necessary power of the system as the power supply destination.

Further, the storage battery control device 100 sets a threshold value of the SOC of each of the storage battery modules M1 to Mn which is a threshold value at the end of the first process based on the battery information stored for each of the storage battery modules M1 to Mn such as the OCV-SOC curve line of the storage battery modules M1 to Mn. The process proceeds from step S103 to step S104.

In step S104, the storage battery control device 100 turns on all the switches S2 of the storage battery string 10 to connect all the storage battery modules M1 to Mn in series. Next, in step S105, the storage battery control device 100 starts the first process. In the first process, the storage battery control device 100 causes the storage battery modules M1 to Mn to discharge while switching the bypass circuits B1 to Bn in accordance with the discharge bypass schedule.

Next, in step S106, the storage battery control device 100 compares the threshold values of the SOC set in step S103 with the SOC of the storage battery modules M1 to Mn, and determines whether there is a storage battery module, among the storage battery modules M1 to Mn, whose SOC has decreased to be equal to or smaller than the threshold value. Step S106 is repeated until an affirmative determination is made, and when an affirmative determination is made in step S106, the process proceeds to step S107.

In step S107, the storage battery control device 100 determines whether all the storage battery modules M1 to Mn of the storage battery string 10 are respectively bypassed by the bypass circuits B1 to Bn. When an affirmative determination is made in step S107, the process proceeds to step S109. When a negative determination is made in step S107, the process proceeds to step S108.

In step S108, the storage battery control device 100 causes the corresponding bypass circuits B1 to Bn to bypass the storage battery modules M1 to Mn determined to have the SOC decreased to be equal to or smaller than the threshold value in step S106. The process returns from step S108 to step S106.

On the other hand, in step S109, the storage battery control device 100 turns on all the switches S2 of the storage battery string 10 to connect all the storage battery modules M1 to Mn in series. That is, the storage battery control device 100 executes the second process of causing all the storage battery modules M1 to Mn to discharge after the first process.

Next, in step S110, the storage battery control device 100 determines whether the available output power of the storage battery string 10 has decreased to be equal to or lower than the minimum necessary power of the system as the power supply destination. Step S110 is repeated until an affirmative determination is made, and when an affirmative determination is made in step S110, the process proceeds to step S111.

In step S111, the storage battery control device 100 turns off all the switches S1 and S2 of the storage battery string 10. Then, the process of the discharge mode ends.

As described above, the storage battery control device 100 executes the first process until the SOC of each of the storage battery modules M1 to Mn decreases to be equal to or smaller than the threshold value of the SOC set for each of the storage battery modules M1 to Mn. By setting the threshold value of the SOC of each of the storage battery modules M1 to Mn for each of the storage battery modules M1 to Mn in accordance with the deterioration state, the temperature, or the like of each of the storage battery modules M1 to Mn, it is possible to reduce the difference between the remaining discharge capacities of the plurality of storage battery modules M1 to Mn at the end time point of the first process.

Although the present invention has been described above based on the above embodiment, the present invention is not limited to the above embodiment, and modifications may be made without departing from the gist of the present invention, and publicly known or well-known techniques may be appropriately combined.

For example, in the above embodiment, the storage battery control device 100 executes the first process according to the discharge bypass schedule obtained in which the combination of the storage battery modules M1 to Mn caused to discharge and the storage battery modules M1 to Mn caused to be bypassed is set for each period. However, in the first process, for example, the storage battery control device 100 may reduce the difference between the remaining discharge capacities of the plurality of storage battery modules M1 to Mn by sequentially bypassing the storage battery modules M1 to Mn whose OCV or SOC has decreased to the threshold value.

Further, from the viewpoint of finally using the remaining discharge capacities of all the storage battery modules M1 to Mn and equalizing discharge completion timings of all the storage battery modules M1 to Mn, it is preferable to equalize the remaining charge capacities of the plurality of storage battery modules M1 to Mn in the first process. However, it is not essential to equalize the remaining discharge capacities of the plurality of storage battery modules M1 to Mn in the first process, and it is sufficient that the difference between the remaining discharge capacities of the plurality of storage battery modules M1 to Mn is reduced in the first process.

In addition, in the above-described embodiment, the threshold value of the discharge completion is set to be uniform, and the first process is performed so that the difference between the remaining discharge capacities until the discharge completion of the plurality of storage battery modules M1 to Mn is reduced in all the storage battery modules M1 to Mn at the end of the second process. However, a threshold value of the discharge completion may be provided for each of the storage battery modules M1 to Mn, and the first process may be performed so that the difference between the remaining discharge capacities until the discharge completion of the plurality of storage battery modules M1 to Mn is reduced in all the storage battery modules M1 to Mn at the end of the second process. That is, the threshold value of the discharge completion may be set for each of the storage battery modules M1 to Mn in accordance with the deterioration state of the storage battery modules M1 to Mn or the type of the storage battery modules M1 to Mn. Accordingly, the threshold value of the discharge completion of the storage battery modules M1 to Mn progressed in deterioration is set to be high, so that the deteriorated storage battery modules M1 to Mn can be prevented from further deteriorating. Further, different types of storage batteries can be used in combination.

In addition, it is not essential that the available output power of the storage battery modules M1 to Mn caused to discharge is maintained to be equal to or greater than the minimum necessary power of the system as the power supply destination until the end time point of the first process. The available output power of the storage battery modules M1 to Mn caused to discharge may be maintained to be equal to or greater than the minimum necessary power of the system as the power supply destination for a period as long as possible from the start of the first process.

In the second process, it is not essential to cause all the storage battery modules M1 to Mn to discharge, and the number of the storage battery modules M1 to Mn caused to discharge may be appropriately set.

What is claimed is:

1. A storage battery control device configured to control a power storage system including a plurality of storage batteries connected in series and a bypass circuit configured to bypass each of the storage batteries, wherein the storage battery control device is configured to execute a first process of causing each of the plurality of storage batteries to discharge while switching the storage batteries caused to be bypassed by the bypass circuit so as to reduce a difference between remaining discharge amounts until discharge completion of the plurality of storage batteries; and a second process of completing the discharge of the plurality of storage batteries after the first process, wherein the first process is executed until an open circuit voltage (OCV) or a state of charge (SOC) of each of the storage batteries decreases to be equal to or smaller than a threshold value of the OCV or the SOC set for each of the storage batteries, the first process is executed according to a predetermined discharge bypass schedule so that available output power of the storage battery caused to discharge does not fall below minimum necessary power of a power supply destination, the predetermined discharge bypass schedule is set in time series such that a combination of two or more of the plurality of storage batteries to be discharged and one or more of the storage batteries to be bypassed is set so as to reduce a difference between remaining discharge amounts until discharge completion of the plurality of storage batteries, and the predetermined discharged bypass schedule includes a plurality of successive periods along a timeline, and is set such that the combination subsequently switches in each of the plurality of periods.

2. The storage battery control device according to claim 1, wherein a state of each of the storage batteries is estimated before start of the first process, and it is determined whether to update the threshold value based on an estimation result.

3. The storage battery control device according to claim 1, wherein a state of each of the storage batteries is estimated before start of the first process, and it is determined whether to update the predetermined discharge bypass schedule based on an estimation result.

4. The storage battery control device according to claim 1, wherein, in the first process, storage batteries whose OCV or SOC decreases to the threshold value are sequentially bypassed.

5. The storage battery control device according to claim 1, wherein the second process is executed until the OCV or the SOC of each of the storage batteries decreases to a threshold value of the OCV or the SOC set for each of the storage batteries.

6. A power storage system comprising:

a plurality of storage batteries connected in series;

a bypass circuit configured to bypass each of the storage batteries; and a storage battery control device configured to control the bypass circuit, wherein the storage battery control device is configured to execute:

a first process of causing each of the plurality of storage batteries to discharge while switching the storage batteries bypassed by the bypass circuit so as to reduce a difference between remaining discharge a mounts until discharge completion of the plurality of storage batteries, and a second process of completing the discharge of the plurality of storage batteries after the first process, the first process is executed until an open circuit voltage (OCV) or a state of charge (SOC) of each of the storage batteries decreases to be equal to or smaller than a threshold value of the OCV or the SOC set for each of the storage batteries, the first process is executed according to a predetermined discharge bypass schedule so that available output power of the storage battery caused to discharge does not fall below minimum necessary power of a power supply destination, the predetermined discharge bypass schedule is set in time series such that a combination of two or more of the plurality of storage batteries to be discharged and one or more of the storage batteries to be bypassed is set so as to reduce a difference between remaining discharge amounts until discharge completion of the plurality of storage batteries, and the predetermined discharged bypass schedule includes a plurality of successive periods along a timeline, and is set such that the combination subsequently switches in each of the plurality of periods.

7. A storage battery control method executed using a storage battery control device configured to control a power storage system including a plurality of storage batteries connected in series and a bypass circuit configured to bypass each of the storage batteries, the storage battery control method comprising executing, by the storage battery control device, a first procedure of causing each of the plurality of storage batteries to discharge while switching the storage batteries caused to be bypassed by the bypass circuit so as to reduce a difference between remaining discharge amounts until discharge completion of the plurality of storage batteries; and a second procedure of completing the discharge of the plurality of storage batteries after the first procedure, wherein the first procedure is executed by the storage battery control device until an open circuit voltage (OCV) or a state of charge (OCV) of each of the storage batteries decreases to be equal to or smaller than a threshold value of the open circuit voltage or the SOC set for each of the storage batteries, the first procedure is executed by the storage battery control device according to a predetermined discharge bypass schedule so that available output power of the storage battery caused to discharge does not fall below minimum necessary power of a power supply destination, the predetermined discharge bypass schedule is set in time series such that a combination of two or more of the plurality of storage batteries to be discharged and one or more of the storage batteries to be bypassed is set so as to reduce a difference between remaining discharge amounts until discharge completion of the plurality of storage batteries, and the predetermined discharged bypass schedule includes a plurality of successive periods along a timeline, and is set such that the combination subsequently switches in each of the plurality of periods.

* * * * *